United States Patent [19]
Drapkin

[11] Patent Number: 5,821,730
[45] Date of Patent: Oct. 13, 1998

[54] LOW COST BATTERY SENSING TECHNIQUE

[75] Inventor: Alexander S. Drapkin, Niles, Ill.

[73] Assignee: International Components Corp., Chicago, Ill.

[21] Appl. No.: 914,903

[22] Filed: Aug. 18, 1997

[51] Int. Cl.[6] ..................................................... H02J 7/02
[52] U.S. Cl. .......................... 320/106; 320/132; 320/140; 320/DIG. 29
[58] Field of Search ..................................... 320/106, 109, 320/128, 132, 135, 140, 163, DIG. 12, DIG. 28, DIG. 29, 111, 126, 408, 149, 157; 363/21, 25, 95, 97, 98; 323/902

[56] References Cited

U.S. PATENT DOCUMENTS

| 3,217,228 | 11/1965 | Jardine . | |
|---|---|---|---|
| 3,843,918 | 10/1974 | Rhyne . | |
| 3,984,799 | 10/1976 | Fletcher et al. | 363/21 |
| 4,460,863 | 7/1984 | Conforti . | |
| 5,130,634 | 7/1992 | Kasai . | |
| 5,150,031 | 9/1992 | James et al. . | |
| 5,325,040 | 6/1994 | Bogut et al. . | |
| 5,352,970 | 10/1994 | Armstrong, II . | |
| 5,465,039 | 11/1995 | Narita et al. . | |
| 5,576,611 | 11/1996 | Yoshida . | |

*Primary Examiner*—Edward Tso
*Attorney, Agent, or Firm*—Fitch, Even, Tabin & Flannery

[57] ABSTRACT

A low cost load sensing technique that is suitable for use in sensing batteries in a battery charging circuit is disclosed. The circuit is adapted to be utilized in conjunction with a power supply which may include a primary converter and a voltage feedback circuit. A transformer with a dual secondary winding is connected between the primary converter and the output terminals of the charging circuit. When no load or battery is present, a first feedback loop is utilized with both of the secondary transformer windings in series, which supplies a constant output voltage at the output terminals. When a load is present, a second feedback loop is utilized which includes one of the secondary windings to provide the voltage of the output terminals. A capacitor is connected in parallel with the other secondary winding. When a load is present, a step increase in voltage occurs across the capacitor due to the fact that the both secondary windings are in phase when a load is present. The voltage across the capacitor is used to drive an indicating circuit which provides an indication of a battery when the voltage across the capacitor exceeds a predetermined value. The indicating circuit may include a voltage divider and a Zener diode, configured to drive a transistor. The configuration of the indicating circuit as well as the feedback loops enable the circuit to detect a load, such as a battery, over a relatively wide dynamic range.

17 Claims, 1 Drawing Sheet

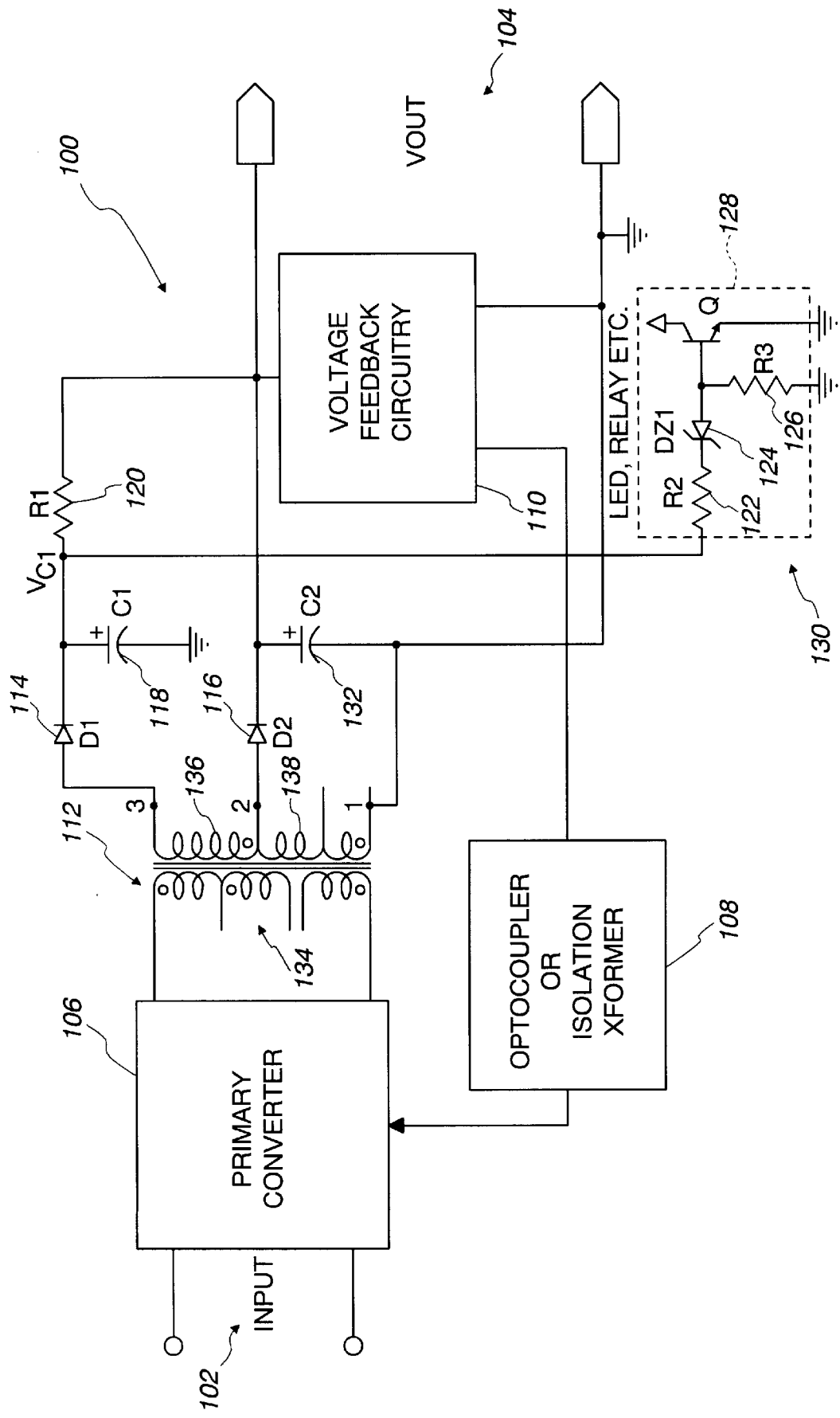

LOW COST BATTERY SENSING TECHNIQUE

BACKGROUND OF THE INVENTION

1. Field of the Invention

The present invention relates to an improved technique for sensing the presence of a load, such as a battery, over a relatively wide range of load currents.

2. Description of Related Art

One consideration in the design of battery charging circuits is the ability to detect whether a battery is present to be charged. Circuits for detecting the presence of a battery would desirably have a large dynamic range to detect loads ranging from a few milliamps to hundreds of amps in order to be useful with a relatively wide range of battery charger products.

Known circuits for sensing the presence of a battery are known to utilize current to voltage conversion. Current to voltage conversion may be accomplished in various ways. For example, current sense resistors may be employed which produce a signal that is amplified and compared to an external reference. However, the current sense resistors and the additional amplifiers add additional cost to the circuitry. In addition, if the power supply or charger is designed for a particular load, then detecting the presence or absence of 0.5% of the nominal load, for example, creates the difficulty of detecting a signal that is comparable to the noise level generated by both the power supply and the background environment. For example, if a 0.1 ohm current sense resistor is used in a 1 amp power supply, a 10 millivolt drop can easily be sensed. If, however, the same resistor is used to sense 5 milliamps of current, the voltage drop becomes 0.5 millivolts, which is difficult to detect using conventional techniques.

Another known method for sensing the presence of a battery is to use a current transformer in which a signal is also amplified and compared to an external reference. The use of current transformers, however, suffers from the same drawbacks as the current sense resistors. In addition, current transformers are significantly less sensitive and require expensive manufacturing processes and additional PC board space.

A third known method typically used for detecting the presence of a battery in a battery charger circuit is using electromechanical switches. However, electromechanical switches have limited applicability in many circumstances and low reliability, as well as high cost.

Accordingly, there is a need for an efficient and inexpensive circuit for detecting the presence of a load, such as a battery. There is additionally a need for a circuit to detect a battery that is configured to have a high dynamic range and be able to detect loads ranging from milliamps to hundreds of amps.

SUMMARY OF THE INVENTION

A low cost load sensing technique that is suitable for use in sensing batteries in a battery charging circuit is disclosed. The circuit is adapted to be utilized in conjunction with a power supply which may include a primary converter and a voltage feedback circuit. A transformer with a dual secondary winding is connected between the primary converter and the output terminals of the charging circuit. When no load or battery is present, a first feedback loop is utilized with both of the secondary transformer windings in series which supplies a constant output voltage at the output terminals. When a load is present, a second feedback loop is utilized which includes one of the secondary windings to provide the voltage of the output terminals. A capacitor is connected via a diode to the other secondary winding. When a load is present, a step increase in voltage occurs across the capacitor due to the fact that the both secondary windings are in phase when a load is present. The voltage across the capacitor is used to drive an indicating circuit which provides an indication of a battery when the voltage across the capacitor exceeds a predetermined value. The indicating circuit may include a voltage divider and a Zener diode, configured to drive a transistor. The configuration of the indicating circuit as well as the feedback loops enable the circuit to detect a load, such as a battery, over a relatively wide dynamic range.

BRIEF DESCRIPTION OF THE DRAWINGS

A better understanding of the present invention is obtained when the following detailed description is considered in conjunction with the following drawing in which the sole FIGURE is a diagram illustrating a power supply as well as a battery sensing circuit according to the present invention;

DETAILED DESCRIPTION OF THE INVENTION

The present invention relates to a load sensing circuit that is adapted to sense loads over a relatively wide range, for example, from a few milliamps to perhaps one hundred amps. The circuit is particularly useful in battery charging circuits for detecting the presence of a battery. Because of the relatively wide range of the detection circuit, it is adapted to be used for detecting a relatively wide range of battery chargers. Although the circuit is described and illustrated for use as a battery detection circuit, it will be apparent to those of ordinary skill in the art that the detection circuit is adapted to be used to detect various loads other than batteries.

Turning to the sole figure, a battery charger circuit which includes the detection circuit in accordance with the present invention is illustrated. The battery charger circuit includes a pair of input terminals 102, a pair of output terminals 104 to which battery or other load is connected. A capacitor 140 may be connected across the output terminals to stabilize the voltage. The detection circuit is adapted to be utilized with a power supply, for example, a switched mode power supply, which includes a primary converter 106 and voltage feedback circuitry 110. The voltage feedback circuitry 110 is generally known in the art and may be either directly coupled to a primary converter 106 or coupled thereto by way of an isolation device, such as an opto-coupler or an isolation transformer 108.

The primary converter 106 may include a bridge rectifier circuit (not shown) for converting an AC voltage applied to the input terminals 102 to a DC voltage. The primary converter 106 may also include a switched transistor (not shown), which is under the control of the voltage feedback circuitry 110 which forms a feedback loop to maintain a relatively constant voltage at the output terminals 104.

The load sensing circuit in accordance with the present invention, generally identified with the reference numeral 100, may include a transformer 112, which includes a primary winding 134 and dual secondary windings 136 and 138 with the polarities as indicated in FIG. 1. The load sensing circuit 100 also includes a pair of diodes 114, 116, a plurality of resistors 120, 122 and 126 as well as a Zener diode 124. The resistor 120 is connected to the diode 114 defining a node $V_{c1}$. The resistor 120 is used as a load sensing resistor which senses the current to the output terminals 104. A capacitor 134 may be coupled between the node $V_{c1}$ and ground. The node voltage $V_{c1}$, defined across the capacitor 134, is used to drive an indication circuit 130 which includes a transistor 128, the resistors 122 and 126 and the Zener diode 124.

The indication circuit 130 is used to provide an indication of whether a load is present. More particularly, the collector of the transistor 128 may be coupled to an indicating device, such as an LED, relay or the like. When the voltage at the node $V_{c1}$ is sufficiently high, indicating that a load is present, the transistor 128 is turned on, which, in turn, drives an LED or the like. The threshold for driving the transistor 128 is determined in part by the resistor 122, Zener diode 124, and the base-emitter junction of the transistor 128. The Zener diode 124 functions to control the threshold used to drive the transistor 128 which enables the detection circuit to be used for detection of relatively small loads as well as relatively large loads.

In operation, when no load is connected across the output terminals 104, the voltage feedback circuitry 110 draws very little current. As such, very little current flows across the sensing resistor 120. As a result, the voltage across the diode 116 is essentially the voltage across the transformer secondary winding 136, which causes the diode 116 to be reversed biased and the diode 114 to be forward biased. During this condition the output voltage is supplied by both of the secondary windings 136 and 138, forming a first feedback loop. The voltage at the node $V_{c1}$, as scaled by the resistor 122, Zener diode 124 and the base-emitter junction of the transistor 128 during such a condition is insufficient to turn on the transistor 128.

As mentioned above, the voltage feedback circuitry 110 functions to maintain a constant output voltage at the output terminals 104. When a load is connected across the output terminals 104, the output voltage $V_{out}$ is essentially given by equation 1 below:

$$V_{out} = V_{31} - V_{D1} - I_{load}R_1 \qquad (1)$$

where $V_{31}$ is the voltage across the serially connected windings 136 and 138 of the transformer 112, $V_{D1}$ is the forward voltage drop across the diode 114 and $I_{load}R_1$ is the voltage drop across the sensing resistor 120.

During conditions when a load is connected to the output terminals 104 (i.e. a battery is connected), the charging current supplied to the battery is sensed by the sensing resistor 120. During such conditions, when the voltage drop across the sensing resistor 120 exceeds $V_{31}-V_{D1}-V_{out}$, the diode 116 becomes forward biased and the secondary winding 138 attempts to feed the load connected to the output terminals $V_{out}$ forming a second feedback loop which includes the secondary winding 138, and the diode 116.

Since the feedback signal from the voltage feedback circuitry 110 attempts to regulate the output voltage at the output terminals 104 during such a condition, both windings 138 and 136 will be boosted during this condition once the load current through the sensing resistor 120 exceeds the threshold value described above. Since the voltage across the output winding 136 is in phase with the winding 138 during such a condition, the voltage across the capacitor 134 will be boosted almost as a step function thereby boosting the voltage at the node $V_{c1}$ by the same amount. The step increase in voltage across the capacitor 134 is sensed by the indicating circuit 130.

The use of two feedback loops allows the circuit to detect relatively small currents at very little cost while eliminating the need for current sensing resisters and associated circuitry and power losses.

Obviously, many modifications and variations of the present invention are possible in light of the above teachings. Thus, it is to be understood that, within the scope of the appended claims, the invention may be practiced otherwise than as specificlly described above.

What is claimed is:

1. A battery sensing circuit which includes a pair of input terminals, a pair of output terminals, and a power supply, the battery sensing circuit comprising;
    a first feedback loop, coupled between said pair output terminals and said power supply, for use in a first mode of operation when no load is present;
    a second feedback loop, coupled between said pair of output terminals and said power supply, for use in a second mode of operation when a load is present; and
    an indicating circuit coupled to said first and second feedback loops for indicating the presence of a battery in said second mode of operation.

2. A battery sensing circuit according to claim 1, wherein said sensing circuit includes a transformer having a primary winding and a plurality of secondary windings.

3. A battery sensing circuit according to claim 2, wherein both of secondary windings are included in said second feedback loop.

4. A battery sensing circuit according to claim 2, wherein said only one of said secondary windings is included in a first feedback loop.

5. A battery sensing circuit according to claim 4, wherein one of secondary windings is coupled to a first diode which, in turn, is coupled in series with a resistor defining a node therebetween.

6. A battery sensing circuit according to claim 5, wherein a capacitor is coupled between said node and ground.

7. A battery sensing circuit according to claim 5, wherein said second feedback loop includes a second diode.

8. A battery sensing circuit according to claim 7, wherein said second diode is configured to be reverse biased during a no load condition.

9. A battery sensing circuit according to claim 8, wherein said first diode is configured forward biased during a no load condition.

10. A load detection circuit which includes a pair of input terminals and a pair of output terminals, the load detection circuit comprising:
    a transformer having a primary winding and first and secondary windings, said primary winding coupled to said input terminals;
    a first feedback loop which includes said first and second secondary windings, coupled to said output terminals, said first feedback loop being active in a first mode of operation;
    a second feedback loop which includes one of said first and secondary windings, coupled to said output terminals, and second feedback loop being active in a second mode of operation; and
    an indication circuit for detecting one of said first mode of operation or said second mode of operation.

11. The load detection circuit as recited in claim 10, wherein said first mode of operation is a no-load condition.

12. The load detection circuit as recited in claim 10, wherein said second mode of operation is a load condition.

13. The load detection circuit as recited in claim 10, wherein said power supply is a switched mode power supply.

14. The load detection circuit as recited in claim 10, wherein said first feedback loop includes a first diode and a first resistor defining a node therebetween, said resistor coupled to one of said output terminals.

15. The load detection circuit as recited in claim 14, wherein said second feedback loop includes a second diode coupled to said one of said output terminals.

16. The load detection circuit as recited in claim 14, further including a capacitor coupled between said node and ground.

17. The load detection circuit as recited in claim 16, wherein said indication circuit is coupled to said capacitor.

* * * * *

UNITED STATES PATENT AND TRADEMARK OFFICE
CERTIFICATE OF CORRECTION

PATENT NO. : 5,821,730
DATED : October 13, 1998
INVENTOR(S) : Drapkin It is certified that error appears in the above-identified patent and that said Letters Patent is hereby corrected as shown below:

THE TITLE PAGE:

Line [20], change Application No. from "914,903" to --914,303--.

IN THE CLAIMS:

Col. 4, line 14, after "pair", insert --of--.
Col. 4, line 33, after "of", insert --the--.
Col. 4, line 42, change "no load" to --no-load--.
Col. 4, line 44, change "no load" to --no-load--.
Col. 4, line 52, after "and" delete "second".

Signed and Sealed this

Tenth Day of August, 1999

Attest:

Q. TODD DICKINSON

*Attesting Officer*    *Acting Commissioner of Patents and Trademarks*